(12) United States Patent
Regele et al.

(10) Patent No.: US 6,374,455 B1
(45) Date of Patent: Apr. 23, 2002

(54) FASTENER GROMMET

(76) Inventors: Stephen Matthew Regele; Deborah Rudow Regele, both of Rt. 1 Box 35, Joliet, MT (US) 59041

( * ) Notice: Subject to any disclaimer, the term of this patent is extended or adjusted under 35 U.S.C. 154(b) by 0 days.

(21) Appl. No.: 09/834,209

(22) Filed: Nov. 6, 2000

Related U.S. Application Data

(63) Continuation of application No. 09/233,663, filed on Jan. 19, 1999, now Pat. No. 6,233,782.
(60) Provisional application No. 60/071,954, filed on Jan. 20, 1998.

(51) Int. Cl.$^7$ .............................. F16L 5/00; H02G 3/22
(52) U.S. Cl. ........................... 16/2.1; 24/108; 411/508; 411/913
(58) Field of Search .............................. 16/2.1, 2.2, 2.4; 24/108, 113, 324, 713.6, 578; 403/535, 536, 546, 339; 411/508, 509, 913; 174/153 G, 153 R, 152 G, 152 R, 67

(56) References Cited

U.S. PATENT DOCUMENTS

| | | | | |
|---|---|---|---|---|
| 3,204,284 A | * | 9/1965 | Merriman | 16/2.1 |
| 4,761,860 A | * | 8/1988 | Krauss | 24/713.6 |
| 5,400,461 A | * | 3/1995 | Malish et al. | 411/508 |
| 5,647,107 A | * | 7/1997 | Brewster | 24/713.6 |
| 5,950,277 A | * | 9/1999 | Tallmadge et al. | 16/2.1 |

* cited by examiner

Primary Examiner—Chuck Y. Mah

(57) ABSTRACT

A fastener grommet assembly has a combining function of a fastener and a grommet. The fastener grommet includes two flange members each having an axial opening, a fastening mechanism formed on an outer surface thereof, the fastening mechanism being an axially extended portion that compressibly interlocks with one or more grommets or similar devices.

1 Claim, 7 Drawing Sheets

FASTENER GROMMET

CROSS REFERENCE TO RELATED APPLICATIONS

This application is a continuation of 09/233,663, filed Jan. 19, 1999 now U.S. Pat. 6,233,782, which relates to provisional patent application filed Jan. 20, 1998; Application No. 60/071,954, invention titled "MT PASS (A.K.A. Montana Poncho and Shelter System, Grommet-Fastener), hereafter referred to as Fastener Grommet.

BACKGROUND OF THE INVENTION.

The present invention relates to fastener grommets used in various applications for fastening of one piece of fabric or material (hereafter referred to as "material") to another, or one location on a single piece of material to another location on the same piece, while providing function as a grommet whether unfastened or fastened between locations.

The new art has various applications in the fabric, garment, outdoor wear, recreational, tarpaulin, fabrication, mechanical, wood and metal construction, and related industries. The various embodiments of the invention may be constructed from metal, plastic or other suitable matter. The embodiments of the present invention will provide a valuable and useful function both (e.g. concurrently) as a fastener and as a grommet.

Grommets and Fasteners as individual and separate units are well known in the art for providing individual functions as grommets, or fasteners. The present invention relates to combining these functions into various but singular embodiments. After making numerous inquiries with manufacturers of individual embodiments of fasteners and grommets, and reviewing prior art patents, we have discovered no such prior art that achieves the present art combination of a fastener and a grommet. Various prior art fasteners and grommets may be used in a "side-by-side" fashion. This prior art configuration of two independent pieces of hardware, one a grommet and the other a fastener, allows two separate locations on a piece of material to be fastened together, and may provide utility of a grommet at a separate location on the given material. This prior art requires that two separate and distinct hardware units (e.g. one a grommet embodiment and the other a fastener embodiment) be installed to be utilized. The present invention combines fastener and grommet functions in individual embodiments, thereby accomplishing a new art, and improvement over prior art, greatly improving fabrication efficiency, and economics, reducing weight and improving functional utility and appearance of fabricated garments, tarps, etc.

OBJECTS AND SUMMARY OF THE INVENTION

It is the general purpose and principal object of the present invention to provide fastener grommet embodiments which can fasten one location on a piece of material to another location on the same or a separate piece, while concurrently providing function as a grommet, whether fastened or unfastened.

It is another object of the present invention to provide a fastener grommet embodiment that conforms to the function of the stated general purpose and principal object, is permanently attached to material, and incorporates teachings about new art fastening mechanisms.

It is another object of the present invention to provide a fastener grommet embodiment that conforms to the function of the stated general purpose and principal object, is permanently attached to material, and incorporates the new art in prior art fasteners.

It is another object of the present invention to provide a fastener grommet embodiment that conforms to the function of the stated general purpose and principal object, and is not permanently attached to material.

It is another object of the present invention to provide a fastener grommet embodiment that conforms to the function of the stated general purpose and principal object, is not permanently attached to material, and incorporates a new art improvement on prior art fasteners.

It is yet another object of the present invention to provide a fastener grommet embodiment that is convenient in use, simple in manufacture, easily incorporated into various materials, and is effective in various applications.

Additional objects and advantages of the invention will be set forth in part in the following descriptions, or may be obvious from the descriptions, or may be learned through practice of the invention.

These and related objects and purposes may be achieved through novel fastener grommet embodiments some of which are herein disclosed. The fastener grommet embodiments provide fastener mechanisms of various designs, some examples of new art and some of prior art, that allow the fastening of two or more locations on an individual piece of material or on separate pieces of material, to each other. All of said fastener grommet embodiments encompass an opening that provides a grommet function concurrent with the fastening function. Said opening, in line with openings incorporated in materials receiving the new art fastener grommet embodiments, provides a passageway through which a cord, wire or other device may be passed when the embodiments are fastened between locations. This concurrent fastener and grommet function in single embodiments is a new art and is unlike any singular prior art grommet or fastener embodiment.

Some embodiments of the invention are comprised of two or more flange members joinable to each other and variously adapted to fasten two or more locations on one or more pieces of material to each other.

Another embodiment of the invention may consist of an individual flange member devised to fasten two or more locations on one or more pieces of material to each other.

Some embodiments have flange members engaged and adapted to permanently sandwich material between the first given members while being able to subsequently fasten with second given members of the embodiments at other locations on material, thereby joining two or more locations on material to each other while concurrently providing grommet function whether the first and seconds flange members are fastened or unfastened to each other.

Some of said flange members are not permanently joined together but nonetheless are capable of fastening two or more locations on material to each other while concurrently providing grommet function.

The descriptions of the suggested embodiments of the present invention provide teachings about incorporating the embodiments in materials commonly used in the fabric, garment, outdoor wear, recreational, tarpaulin, mechanical, wood and metal construction, and related industries.

The fastener grommet embodiments may be constructed from metal (brass, steel, etc.), plastic (synthetic organic polymers, etc.) or other suitable matter.

The utility and value of the present art in singular embodiments that incorporate concurrent fastener and grommet function will be intuitively obvious to those manufacturing and using the products of such industries.

The foregoing, and other objects, advantages and features of the present invention, will be more readily apparent to those skilled in the art after review of the detailed description taken together with the drawings.

DETAILED DESCRIPTION

Figure 1:
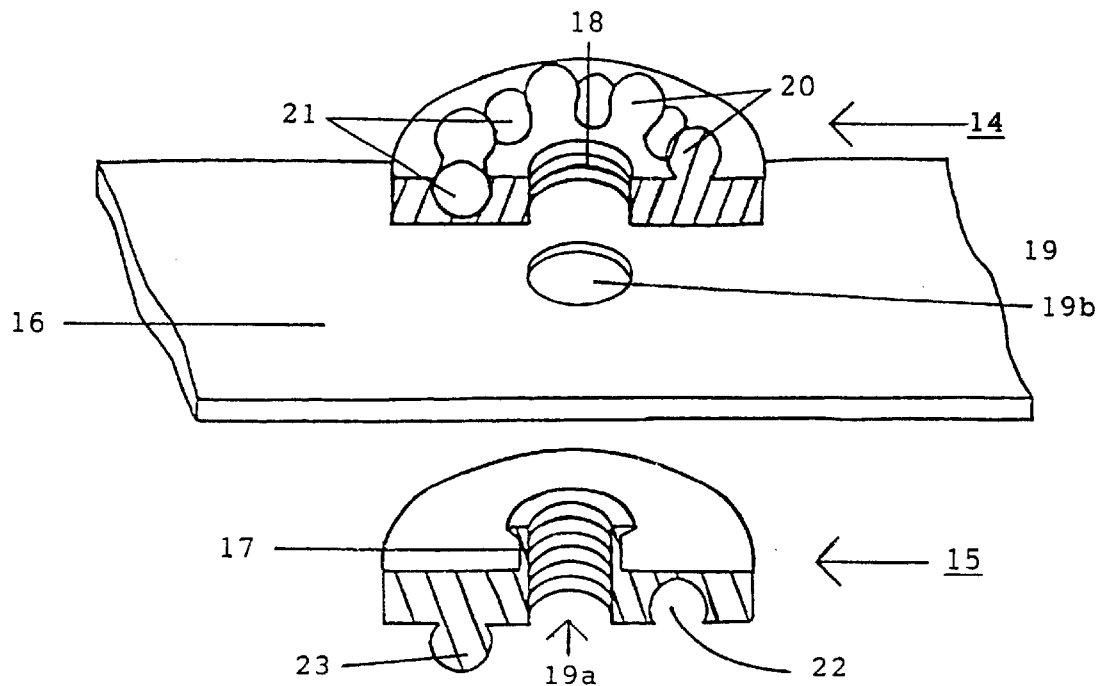
FIG. 1 shows an exploded perspective, partially cut away, of a fastener grommet of a first embodiment having means of attaching the two flanges to material.

Reference will now be made in detail to the presently preferred embodiments of the invention, one or more of which are illustrated in the drawings. Each embodiment, and following claim, is provided by way of explanation of the invention and not meant as a limitation of the invention. For example, features illustrated or described as part of one embodiment may be used on another embodiment to yield still a further embodiment. Obviously many modifications and variations of the invention are possible in light of the present teachings. It is also hereby pointed out that while a circular geometry is generally indicated for individual portions of members of the various embodiments (e.g. portion 82 of member 24 and 82a of member 25 of FIG. 2; portion 71 of member 65 and portion 72 of member 66 of FIG. 5; portion 81 of member 75 of FIG. 6), other geometric shapes (e.g. square, oval, hexagonal) may be used for such said portions of members of the various embodiments to allow for ease of gripping by fingers of the hand or by various prior art tools and still accomplish the same purpose of the invention. It is intended that the present invention include such modifications and variations as come within the scope and spirit of the present invention.

Figure 1A:
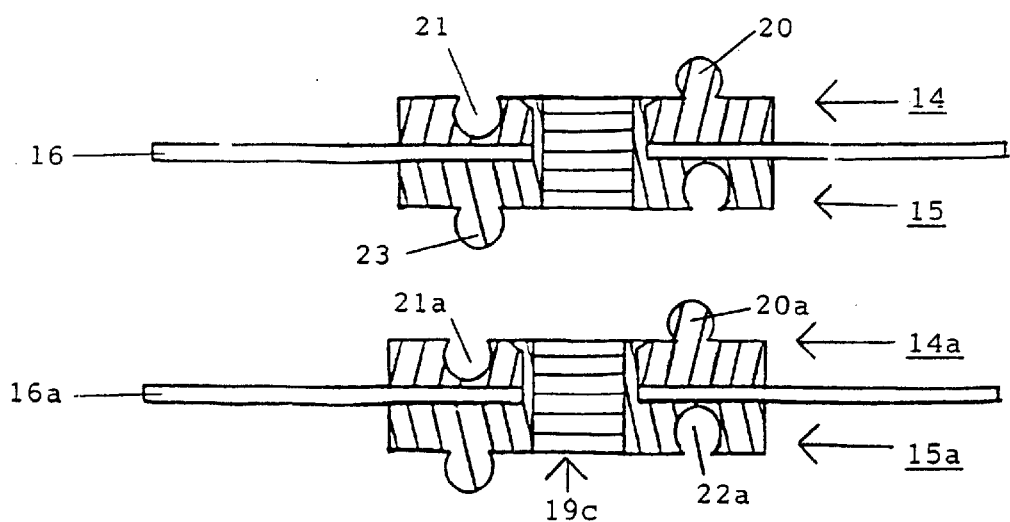
FIG. 1a shows a cross sectional view of the fastener grommet embodiment of FIG. 1.

FIGS. 1 and 1a show a two piece fastener grommet embodiment in accordance with the present invention. The embodiment is generally illustrated as first flange member 14 and second flange member 15 in FIG. 1 and as first members 14 and 14a and second members 15 and 15a in FIG. 1a, each member with a plurality of protrusions 20 and 23 respectively and a plurality of recesses 21 and 22 respectively. First member 14 is fastened to second member 15 through opening 19b in a piece of material 16 thereby sandwiching material 16 between flange members 14 and 15 by the engagement of the axially extended portion 17 of member 15 with the axially extending portion 18 of member 14. Said engagement occurring by methods known to those skilled in prior art, such as engaging threaded surfaces on the exterior of portion 17 of flange member 15 with mated receiving threads on the surface of face 18 on flange member 14, or by an interference fit or snap fit by forcing the annular extension 17 of the second member 15 into the opening 19 of first member 14 in a manner also known to those skilled in prior art and utilizing various means of securing engagement known to those skilled in prior art. The opening 19 of flange member 14 corresponding to an opening 19b in material 16 and opening 19a in flange member 15 provides for function as a grommet as known to those familiar with that art.

Combined with the grommet function of the embodiment is a fastener function allowing one fastener grommet of the present embodiment to be fastened to one or more separate present art embodiments at different locations on the same piece of material (e.g. 16 of FIG. 1a) or on separate pieces of material (e.g. 16 and 16a of FIG. 1a). Said fastening between locations (as illustrated in FIG. 1a) being facilitated, for example, by engaging the plurality of protrusions 23 on flange member 15 of one embodiment of the present invention with the plurality of mated recesses 21a on flange member 14a of a separate embodiment of the present invention. The present art thereby combining a new art fastener function between two or more locations, as in the example illustrated in FIG. 1a, with a concurrent grommet function provided through opening 19c. Said grommet function being provided whether a first embodiment (e.g. flange member 14 and second member 15) is unfastened or fastened to a second embodiment (e.g. first flange member 14a and second flange member 15a), or to mateable flange members of additional embodiments.

This combined utility of fastener and grommet in a single embodiment being representative of the present invention.

Figure 2:
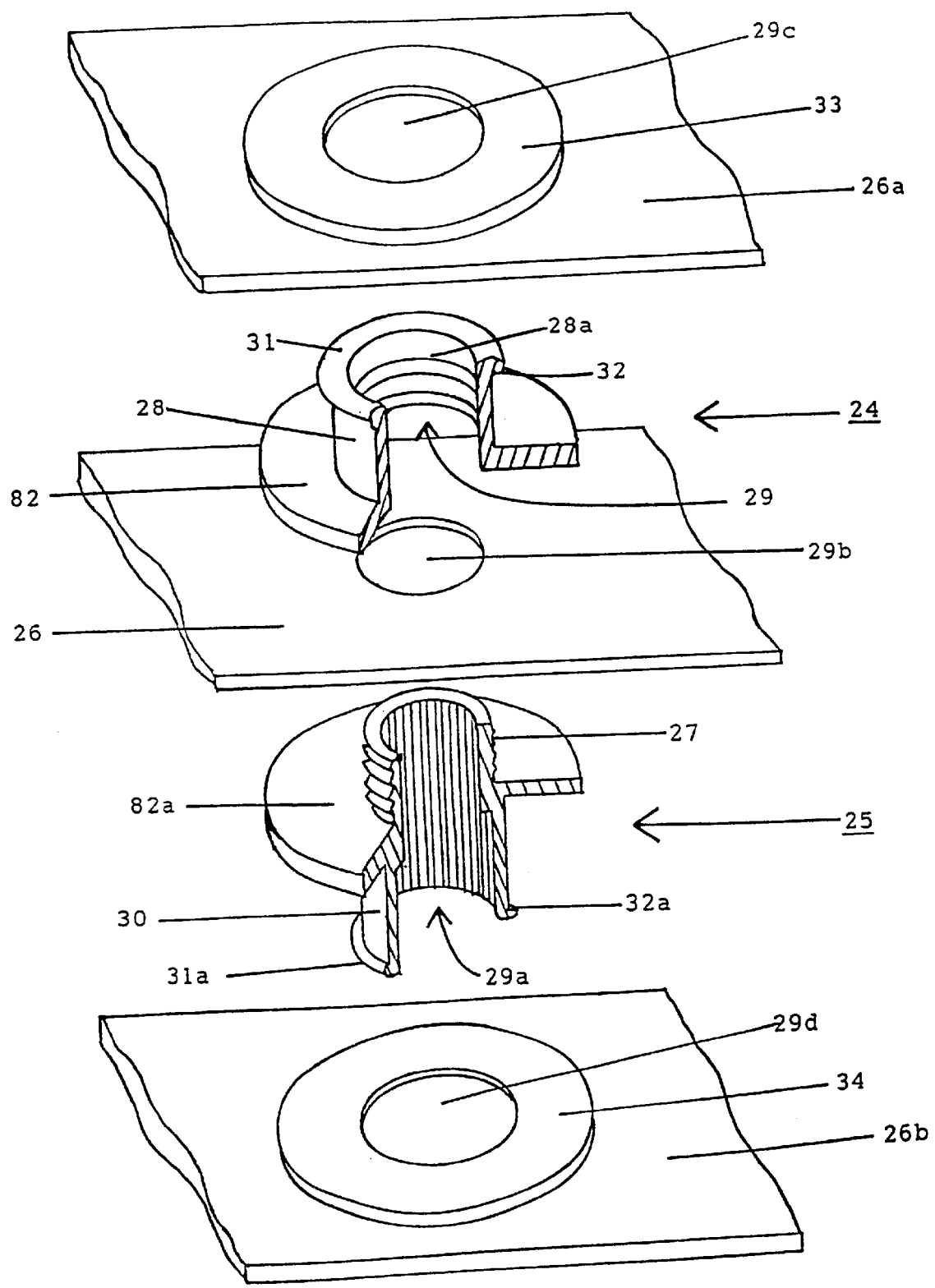
FIG. 2 shows an exploded perspective, partially cut away, of a fastener grommet of a second embodiment having means of attaching the two flanges to material, and the use of the new art embodiment in conjunction with prior art grommets.

FIG. 2 shows a two piece fastener grommet embodiment generally illustrated as first flange member 24 and second flange member 25 in accordance with the present invention. First member 24 is fastened to second member 25 through opening 29b in a piece of material 26 thereby sandwiching material 26 between flange members 24 and 25 by the engagement of the axially extending portion 27 of member 25 with the axially extending portion 28 of member 24. Said engagement occurring by methods known to those skilled in prior art, such as by engaging threaded surfaces on the exterior of portion 27 of flange member 25 with mated receiving threads on inner surface 28a of portion 28 of flange member 24, or by an interference fit or snap fit by forcing the annular extension 27 of the second member 25 into the opening 29 of first member 24 in a manner also known to those skilled in prior art and utilizing various means of securing engagement known to those skilled in prior art. The opening 29 of flange member 24 corresponding to an opening 29b in material 26 and opening 29a in flange member 25 provides for function as a grommet as known to those familiar with that art.

Combined with the grommet function of the embodiment is a fastener function allowing one fastener grommet of the present embodiment to fasten two or more different locations together whether these locations are on the same piece of material or on separate pieces. Said fastening being illustrated in FIG. 2 and FIG. 2b and being accomplished, for example, when axially extending portion 28, having a diameter (e.g. outer edge of surface 31) slightly larger than opening 29c in a prior art grommet embodiment such as 33 that has been affixed to material 26a as common to prior art, is forcibly passed into and through opening 29c thereby fastening the location of member 24 of the present art embodiment on material 26 to the location of prior art grommet 33 on material 26a. A rounded or otherwise configured enlargement forming an edge or lip (e.g. 32 on member 24 of FIG. 2), as is common to prior arts, having an outer diameter slightly larger than the diameter of the remaining portion of axially extended portion 28 of embodiment member 24 with said edge acting to fasten said member 24 to prior art grommet 33 in a semi-permanent fashion. The configuration and fastening characteristics described for member 24 of the present embodiment and prior art grommet 33 apply to member 25 of the present embodiment and prior art grommet 34 on material 26b as well. When the present fastener grommet embodiment (members 24 and 25) is fastened to prior art grommets such as 33 and 34, grommet function is provided through the continuous openings 29c, 29, 29b, 29a, and 29d.

The present art thereby combining a new art fastener function between two or more locations on a given material, as represented by 26, 26a and/or 26b, or between locations on separate pieces of material as may be inferred by 26, 26a and/or 26b, with a concurrent grommet function being provided by the present art embodiment whether a first member 24 or a second member 25 of the given embodiment is unfastened or fastened to a prior art grommet such as 33 or 34 (or other opening) in material such as 26a and/or 26b. This combined utility of fastener and grommet in a single embodiment being representative of the present invention.

Figure 2A:
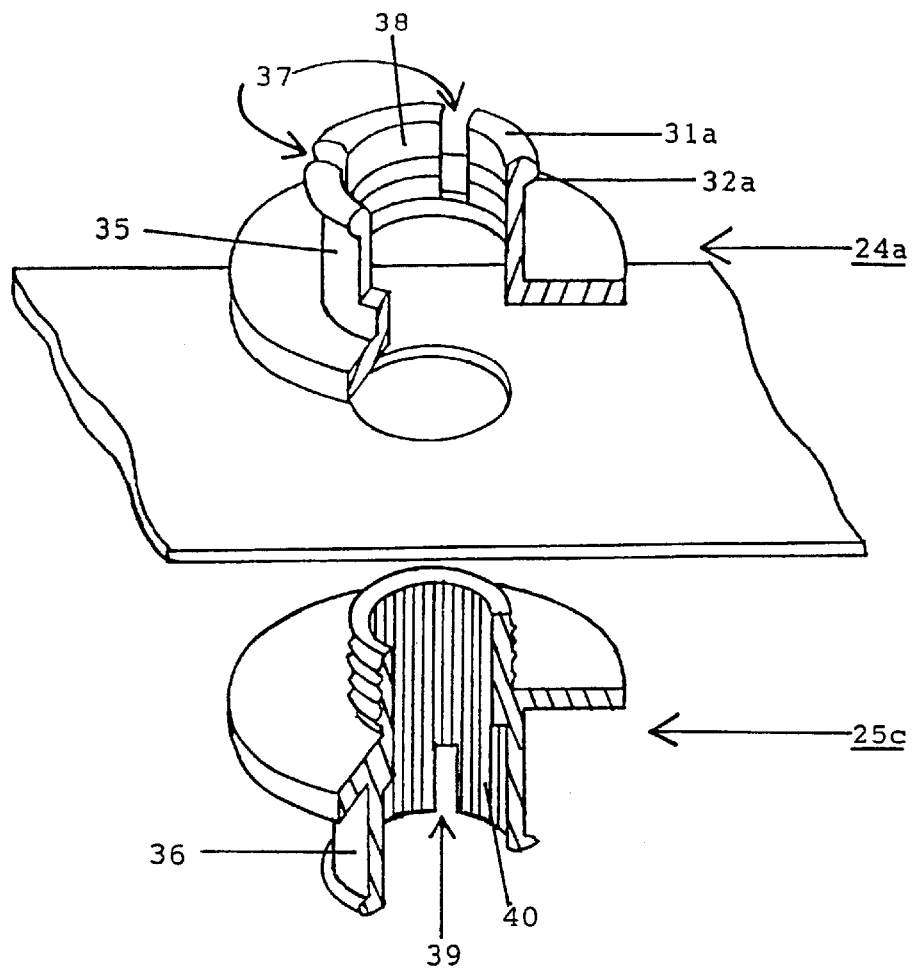
FIG. 2a shows a variation of FIG. 2.

FIG. 2a shows a variation of the embodiment in FIG. 2. The variation being that the single axially extending portion 28 of flange member 24 and 30 of flange member 25 of in FIG. 2 is replaced by axially extending portions such as 38 and 36 of flange member 24a and 25c respectively which are divided by gaps such as 37 in member 24a and 39 in member 25c in FIG. 2a. Said configuration or similar variations intended to allow various degrees of ease in forcibly passing the axially extending portion 35 of FIG. 2a through openings such as 29c of FIG. 2.

It is also noted that FIGS. 2 and 2a are intended to reflect that individual members such as 24 and 24a of the present embodiments of FIGS. 2 and 2a respectively can be used without attachment to second members 25 and 25c and therefore without attachment to material such as 26. Members 24 and/or 24a nonetheless providing fastening and grommet utility by incorporating in their construction a suitable length of axially extended portions 28 and 35, respectively, that facilitate passing of said axially extended portions through two and more prior art grommets, such as 33 and 34 of FIG. 2, fastening said grommets to each other, and concurrently providing prior art grommet function as already described herein. This combined utility of fastener and grommet in a single member of the embodiment, described in FIGS. 2 and/or 2a, also being representative of the present invention.

Figure 2B:
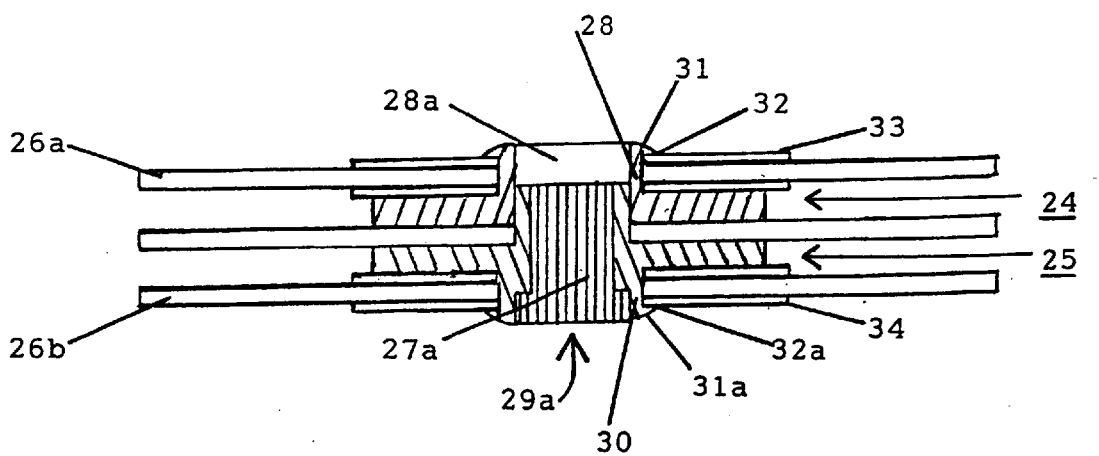
FIG. 2b shows a cross sectional view of the fastener grommet embodiment of FIG. 2.

FIGS. 2b shows a cross section of the embodiments shown in FIG. 2 to provide clarity in relation to utility and configuration of the present embodiment of the new art. The figure is also helpful to demonstrate that the fastener grommet function described for portions 28, 31, and 32 of flange member 24 on material 26 in conjunction with grommet 33 on material 26a is the same as that fastener grommet function provided by portions 30, 31a, and 32a on flange member 25 in conjunction with grommet 34 on material 26b.

Figure 3:
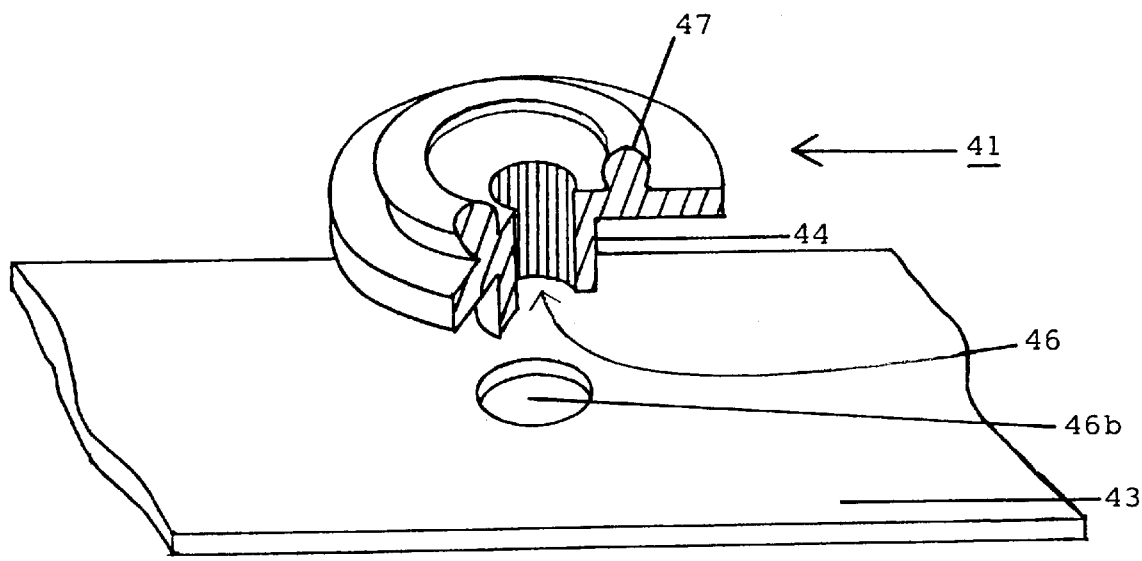
FIG. 3 shows an exploded perspective of a fastener grommet of a third embodiment with a circular raised ridge on one flange, a recessed trough on the other flange, and means of attaching the two flanges to material.
Figure 3:
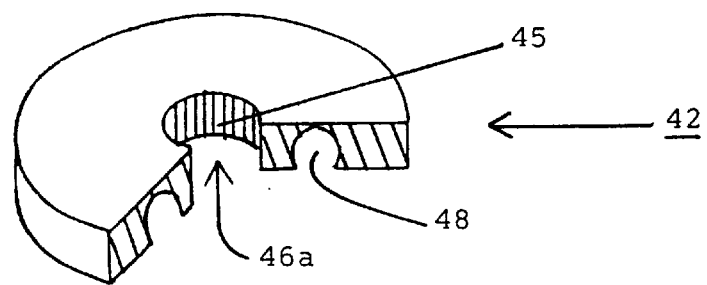
Figure 3A:
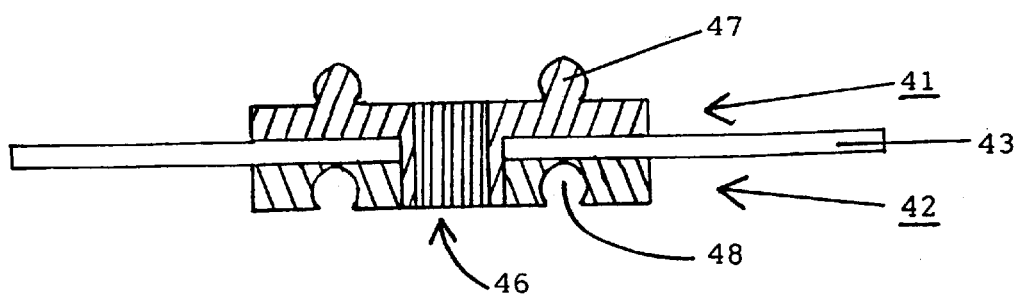
FIG. 3a shows a cross section of the fastener grommet embodiment of FIG. 3.

FIG. 3 shows a two piece fastener grommet embodiment generally illustrated as first flange member 41 and second flange member 42 in accordance with the present invention. First member 41 is fastened to second member 42 through opening 46b in a piece of material 43 thereby sandwiching material 43 between flange members 41 and 42 by the engagement of the axially extending portion 44 of member 41 with the axially extending portion 45 of member 42. Said engagement occurring by methods known to those skilled in prior art, such as engaging threaded surfaces on the exterior of portion 44 of flange member 41 with mated receiving threads on the surface 45 of flange member 42, or by an interference fit or snap fit by forcing the annular extension 44 of the first member 41 into the opening 46a of second member 42 in a manner also known to those skilled in prior art, and utilizing various means of securing engagement known to those skilled in prior art. The opening 46 of flange member 41 corresponding to an opening 46b in material 43 and opening 46a in flange member 42 provides for function as a grommet as known to those familiar with that art.

Combined with the grommet function of the embodiment is a fastener function allowing one fastener grommet of the present embodiment to fasten two or more different locations on the same piece of material to each other or to fasten two or more locations on separate pieces of material to each other. Said fastening being accomplished when annular projection 47 of member 41 of one given embodiment at a given location on a piece of material 43 is forcibly pressed into a mated recess or groove 48 of member 42 of another given embodiment at a separate given location on material 43, or located on a piece of material separate from 43, thereby allowing one fastener grommet of the present embodiment to be fastened to one or more separate fastener grommets of the present embodiment at different locations on the same or a separate piece of material generally represented as 43.

The present art thereby combining a new art fastener function, between two or more locations on material 43 or between locations on separate pieces of material as may be inferred, with a concurrent grommet function being provided whether a first or second member of the embodiment of the present invention is unfastened or fastened to another mated second or first member (respectively) of a separate embodiment. This combined utility of fastener and grommet in a single embodiment being representative of the present invention.

Figure 4:
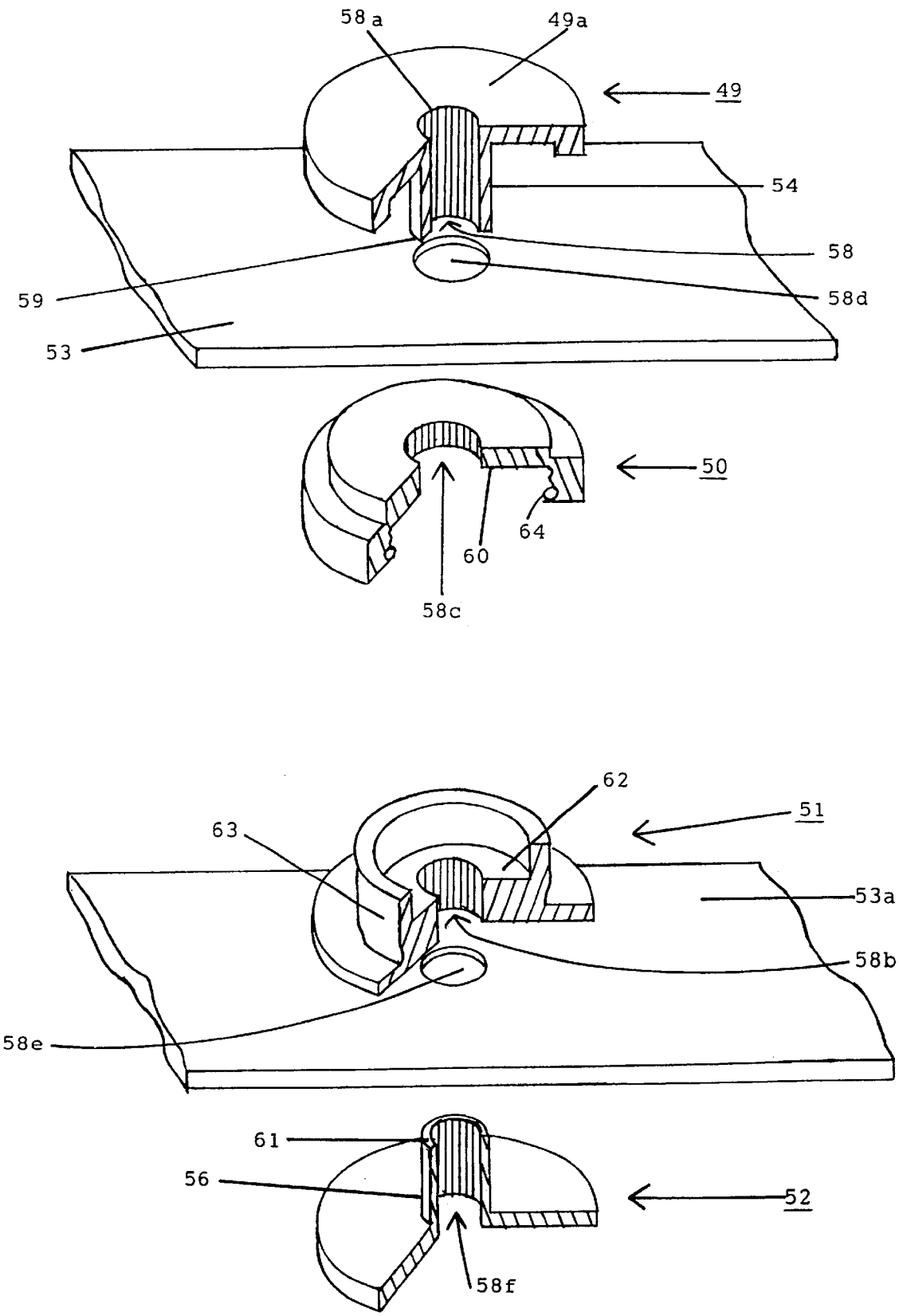
FIG. 4 shows an exploded perspective, partially cut away, of a fastener grommet of a fourth embodiment having means of attaching the two flanges to material.

FIG. 4 shows a view of a prior art snap fastener embodiment consisting of prior art components: flange member 49 and flange member 50, that when engaged by convention of the prior art sandwich material 53 therebetween, and prior art flange member 51 and flange member 52 that also become engaged by convention of the prior art sandwiching material 53a therebetween. Flange member 50 can then be engaged or snapped onto flange member 51, according to prior art, with axially extended portion 63 of flange member 51 being retained in flange member 50 by a prior art spring clamp 64 housed in the interior of flange member 50, as occurs in the prior art, thereby fastening joined flange members 49 and 50 at one location on material 53 to joined flange members 51 and 52 at another location as on material 53a as is the previous art of the fastener.

The prior art embodiment providing function as a snap fastener only with no concurrent function as a grommet of conventional prior art intended or implied by the prior art snap fastener.

The art of the present invention improves on the prior art snap fastener by incorporating an opening 58a, according to the present art, in surface 49a of flange member 49 that is aligned with prior art openings 58 in flange member 49, 58d in material 53, 58c in flange member 50, 58b in flange member 51, 58e in material 53a, and 58f in flange member 52 with the specific intended purpose of allowing the present art opening to be continuous through all members of the prior art embodiment and fabric engaged thereby to function in the new art as a grommet in conjunction with concurrent function as a prior art snap fastener.

It is notable that in order that a clear, unhindered, and continuous opening be provided through said members of the prior art embodiment to facilitate the new art of a concurrent and fully functional grommet utility, rim-edge 59 of axially extending portion 54 of flange member 49 must be accurately compressed in a manner allowing flaring of edge 59 to be smoothly distributed over surface 60 of flange member 50, and rim-edge 61 of axially extending portion 56 of flange member 52 must be accurately compressed in a manner allowing flaring of edge 61 to be smoothly distributed over surface 62 of flange member 51. With care and proper utilization of prior art tools this level of accuracy in flaring may be accomplished by those skilled in the art.

The described combined utility of fastener and grommet in a single embodiment being representative of the present invention.

Figure 5:
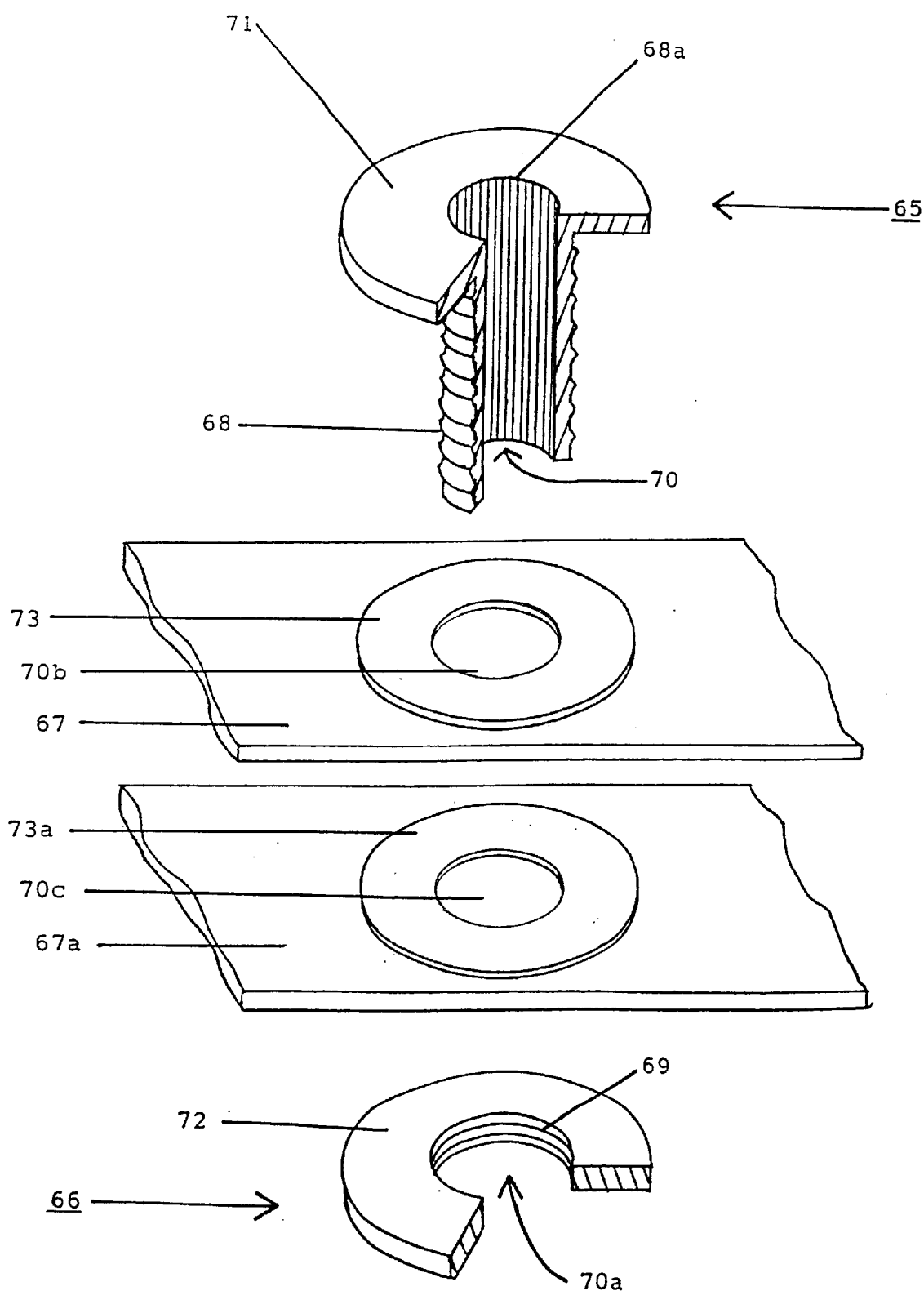
FIG. 5 shows an exploded perspective, partially cut away, of a fastener grommet of a fifth embodiment and the use of the embodiment in conjunction with prior art grommets and/or material.

FIG. 5 shows a two piece fastener grommet embodiment generally illustrated as first flange member 65 and second flange member 66 in accordance with the present invention. First flange member 65 having an opening 70 which passes through surface 71 and axially extending portion 68 of flange member 65. Second flange member 66 having an opening 70a passing through surface 72 and defined by the surface of axially extending portion 69 of flange member 66. First flange member 65 may be connected to second flange member 66 by a retaining device 74. This device 74 may provide convenience in keeping the two flanges 65 and 66 of the embodiment together for certain applications and for unified storage of the embodiment. Device 74 may be constructed of the same matter as flanges 65 and 66, may be fused to flange member 66, and may be held to flange member 65 in a manner allowing member 65 to rotate freely within a ring attached to device 74 encircling the axially extending portion 68 of flange member 65 as is known to those familiar with the prior art of the device.

The axially extended portion 68 of first flange member 65 may be passed through opening 70b in prior art grommet 73 that has been affixed to material 67, as common to prior art, said opening 70b being of larger diameter than the diameter of portion 68 and smaller than the diameter of portion 71 of flange member 65. Said axially extended portion 68 of first flange member 65 may subsequently be passed through additional openings in additional prior art grommets such as through opening 70c in prior art grommet 73a that has been affixed to material 67a, as common to prior art, said opening 70c also being of larger diameter than the diameter of portion 68 and smaller than the diameter of portion 71 of flange member 65.

First flange member 65 may then be engaged with second flange member 66, thereby sandwiching grommet 73 on material 67 and grommet 73a on material 67a between flange members 65 and 66. Said engagement occurring by methods known to those skilled in prior art such as engaging threaded surfaces on the exterior of portion 68 of flange member 65 with mated receiving threads on the surface of portion 69 of flange member 66. Additional means of engagement of flange members such as 65 and 66 of the present embodiment are briefly described in the context of FIG. 2 embodiment descriptions and are referred to therein as "interference fit or snap fit" engagements. The engagement thus fastening two or more locations to each other on a single piece of material such as may be inferred by FIG. 5 assuming that location of opening 70b and 70c are simply at separate locations on a single piece of material represented by 67/67a, or the present embodiment can fasten two or more locations to each other on separate pieces of material as also may be inferred by FIG. 5 assuming that location of opening 70b and 70c are located on separate pieces of material represented by 67 and 67a.

The present embodiment therefore representative of the new art by combining a prior art fastener function between two or more locations on a given piece of material or between locations on separate pieces of material resulting from the engagement of flange members 65 and 66, with a concurrent grommet function being provided by opening 70 in flange member 65 with axially extended portion 68 inserted through two or more openings such as 70b and or 70c in material such as 67, 67a respectively.

It is pointed out that the present fastener grommet embodiment may provide the new art function of combination fastener and grommet when openings in material are provided as described, whether said openings are faced by prior art grommets or not.

The described combined utility of fastener and grommet in a single embodiment being representative of the present invention.

Figure 6:
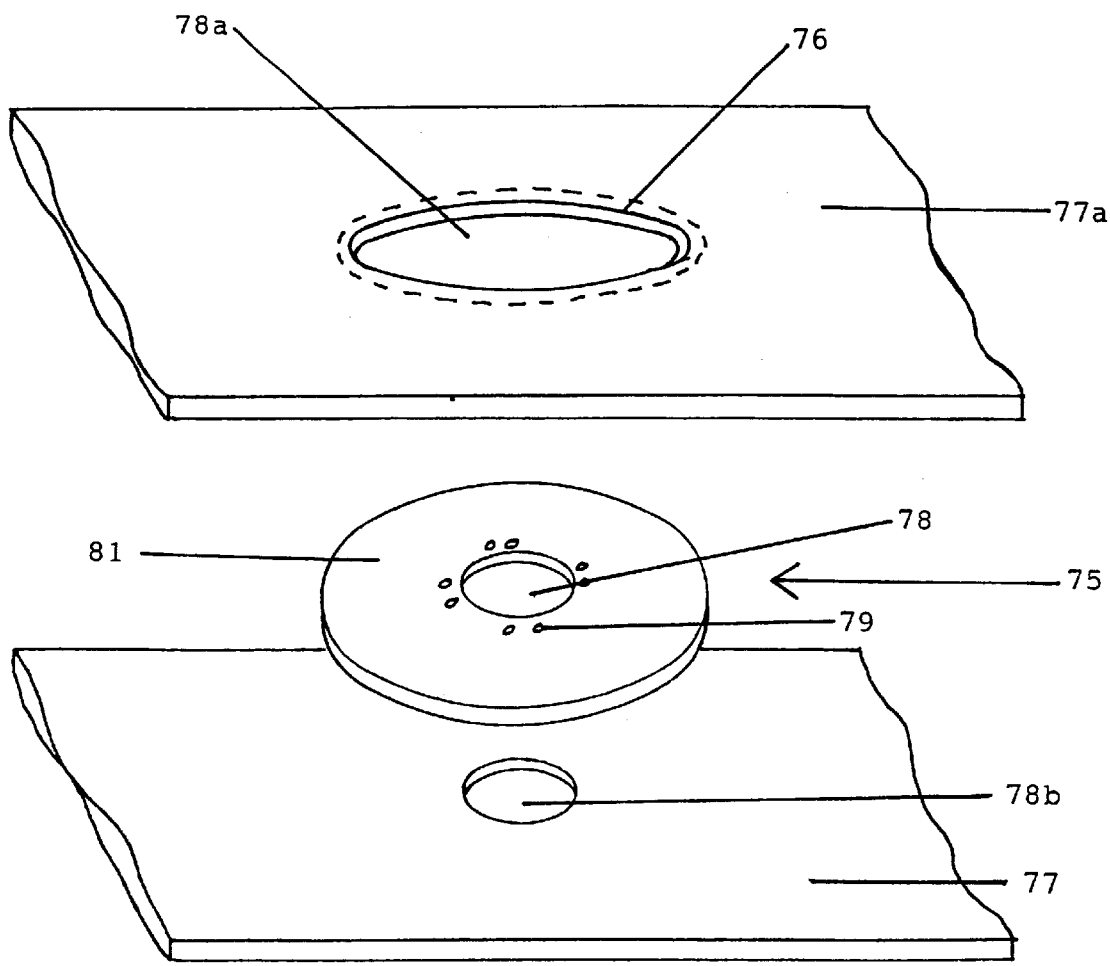
FIG. 6 an exploded perspective of a fastener grommet of a sixth embodiment having means of attaching the grommet to a material.

FIG. 6 shows a two piece fastener grommet embodiment generally illustrated as flange member 75 and second member 76 in accordance with the present invention. First member 75 being similar to prior art flange members usually referred to as buttons, with the new art incorporation of an opening 78 in flange member 75. Said opening 78 overlying an opening 78b in material 77. Flange member 75 is attached to material 77 by threads or other devices passing through openings such as 79 in member 75 and thence through material 77 in a manner encircling openings 78 and 78b and otherwise engaging flange member 75 to material 77 as is the common prior art of engaging a button to a piece of fabric. A prior art button-hole such as member 76 in material 77a may then engage flange member 75 as is also common in the prior art of a button to button-hole-type fastening system.

The opening 78 in flange member 75, in line with opening 78a in button-hole-type member 76 and with opening 78b in material 77, provides for function as a grommet. The present embodiment therefore representative of the new art by combining a prior art fastener function (fastening two or more locations on a given piece of material or locations on separate pieces of material that results from the engagement of flange member 75 and member 76) with a concurrent new art grommet function (grommet function being provided by opening 78 in flange member 75, in line with opening 78a in button-hole-type member 76, and with opening 78b in material 77).

The present art also allows the new art fastener grommet embodiment to accommodate such jewelry as cuff-links when said embodiment is incorporated into a garment.

The described combined utility of fastener and grommet in a single embodiment being representative of the present invention.

The present invention can enhance the utility and marketability of various other prior art reclosable fastening systems. No graphic illustrations are necessary and are therefore not presented herein. A brief description of some of the new art applications are, however, described as follows. The invention of the new art fastener grommet utility can be incorporated in some prior art fastener systems by creating an opening in an appropriate location in each member of a prior art fastener system, such as hook-and-loop fasteners or other fastening systems. Said openings in line with openings created within material that the prior art fasteners are attached to, thereby implementing the new art combination of grommet utility and function in such prior art fasteners. The new art may be a significant enhancement in the versatility and marketability of various prior art fastener embodiments.

In light of the above teachings, it is obvious to those skilled in the art that modifications of the shapes and configurations can widely vary within, but without departing from, the scope and spirit of the invention. It is to be understood there are no limitations to the invention even though the nature of the words in the description are in an illustrative form.

What is claimed is:

1. A fastener grommet assembly comprising:

first and second cylindrical flange members being used individually or in combination, each of the members having an outer surface and an inner surface, a defined axial opening, said members being joinable to each other by mutual engaging means formed on said flange members and adapted to permanently or temporarily sandwich at least one piece of material between the inner surfaces;

the outer surface of each flange member having a fastening mechanism consisting of an axially extended portion, said axial opening extending through said extended portion;

said axial extended portion having a radially compressible lip formed on an outer edge thereof, said lip enables said extended portion to form a releasable snap-lock into an opening of one or more grommets attached to a piece of said material so that one location on said piece of material can be fastened to another location or to a separate piece of material, and wherein said axial openings provide a passageway through which a cord, wire or other device can be passed, and each flange member is made of plastic or metal.

* * * * *